April 3, 1962 E. W. FRIEDRICH 3,028,128
REENTRY VEHICLE LEADING EDGE

Filed Aug. 2, 1960 2 Sheets-Sheet 1

INVENTOR
EUGENE W. FRIEDRICH

BY

ATTORNEY

April 3, 1962     E. W. FRIEDRICH     3,028,128
REENTRY VEHICLE LEADING EDGE
Filed Aug. 2, 1960     2 Sheets-Sheet 2
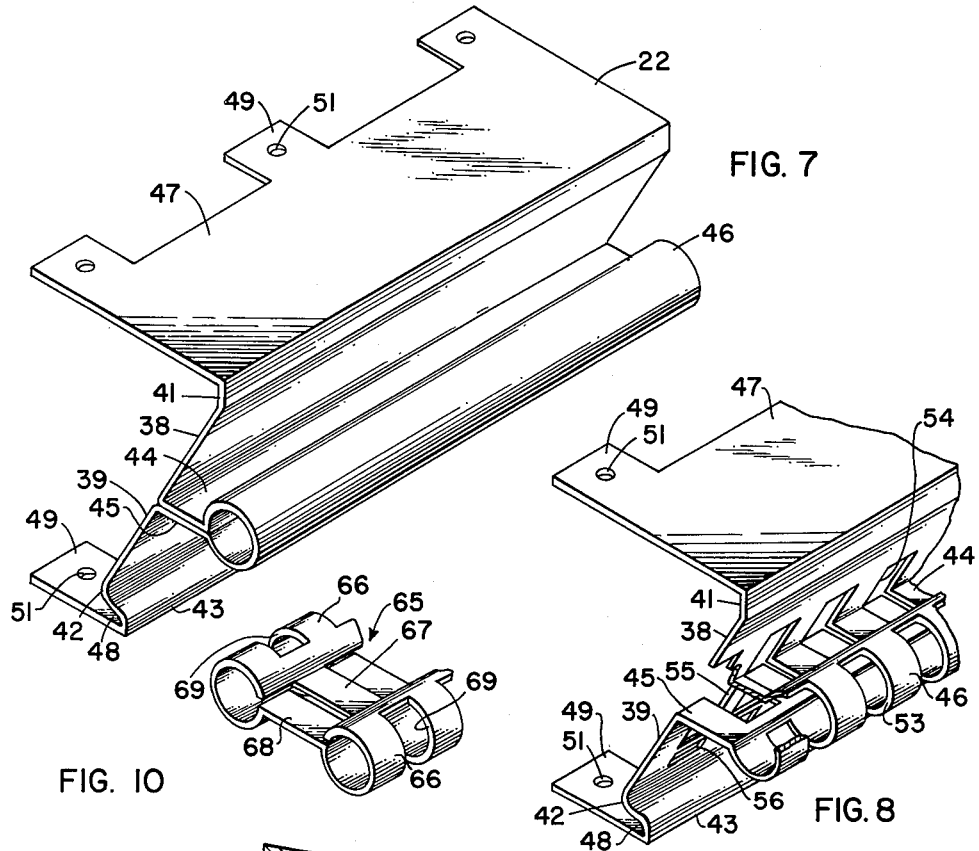
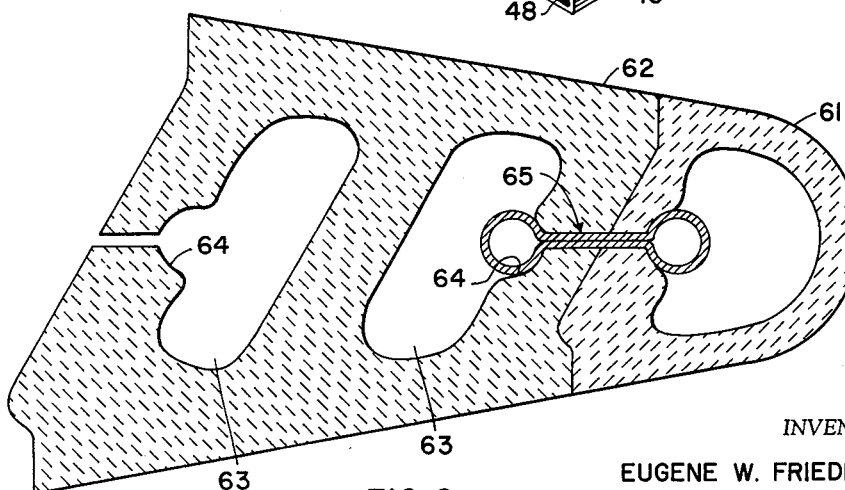
INVENTOR
EUGENE W. FRIEDRICH
BY
ATTORNEY 3,028,128
Patented Apr. 3, 1962

3,028,128
REENTRY VEHICLE LEADING EDGE
Eugene W. Friedrich, Glen Ellyn, Ill., assignor to the United States of America as represented by the Administrator of the National Aeronautics and Space Administration
Filed Aug. 2, 1960, Ser. No. 47,120
14 Claims. (Cl. 244—117)
(Granted under Title 35, U.S. Code (1952), sec. 266)

The invention described herein may be manufactured and used by or for the Government of the United States of America for governmental purposes without the payment of any royalties thereon or therefor.

This invention relates generally to a leading edge construction for the lifting surfaces of an aerial vehicle; and more particularly to a nonmetallic leading edge construction for the lifting surfaces of a vehicle operable in space and capable of reentering the earth's atmosphere at hypersonic velocities, with the further capability of controlled flight within the atmosphere and landing upon the earth's surface.

The leading edges of the lifting surfaces of an aerial vehicle moving at hypersonic speeds within the earth's atmosphere, even at very high altitudes where atmospheric density is minimal, are subject to extremely severe aerodynamic heating. Since the phenomenon of aerodynamic heating is well known in the art, it is not considered necessary to extensively develop the subject herein, except to point out that the region of stagnation along the leading edge of the aerodynamic surfaces of the hypersonic vehicle is the most critically heated portion of these surfaces. The practical requirement for providing a leading edge construction capable of withstanding the temperatures developed thereon in hypersonic flight, which may be in excess of several thousand degrees Fahrenheit, has been seriously considered only in the last few years, however, in connection with the commencement of studies of the design of hypersonic reentry vehicles from the structural engineering viewpoint. For this reason, prior art in this field is sparse and somewhat limited in scope.

By way of illustration, one of the approaches suggested in the past to provide a solution of the outlined problem contemplates the modification of generally conventional metallic wing leading edge structures of the type found in present day subsonic and low supersonic aircraft to include a leading edge member formed of a metal exhibiting superior elevated temperature structural properties, such as molybdenum or columbium, and which is made adequately massive to provide a heat sink capability with sufficient conduction of heat to cooler regions aft to reduce the maximum temperatures at the stagnation point. It will be apparent, however, that such metal leading edge members must be coated with a suitable heat resistant material to provide protection for the base metal from oxidation. The use of such metal leading edge members, therefore, is considered disadvantageous not only from the standpoint of the severe weight penalty inherent therein, but also in that maximum allowable temperatures at the stagnation point are unduly limited in order to prevent damage to the coating and consequent rapid destruction of the leading edge member by oxidation.

The efforts of still other investigators to solve the hypersonic leading edge heating problem have been directed to the provision of nonmetallic hemi-cylindrical leading edge members composed of substances such as graphite, silicon carbide, and synthetic resin impregnated ceramics. These members require intricate metallic attachment elements which must be manufactured to close tolerances, and where metallic-nonmetallic contact exists, this type of construction creates local hot spots. Further, the differences in thermal expansion of the dissimilar materials may create critical local thermal stresses which will readily cause failure of this type of construction.

It has also been proposed that leading edges for hypersonic vehicles of the conventional sheet metal type of construction be utilized, with the added provision of an ablation shield to afford thermal protection of the metallic structure. This scheme, however, is considered undesirable, since a substantial mass of ablative material concentrated at the region of stagnation of the leading edge would be required, and leading edge contour changes during operation of the vehicle due to ablation of this material would cause severe aerodynamic penalties. Such an ablation shield, moreover, would be subject to costly and time consuming restoration after completion of every operational mission of the vehicle.

One further scheme suggested in the past as a solution of the outlined problem involves the introduction of a fluid coolant flow through a conventional metallic leading edge structure to remove heat therefrom by conduction, but this type of cooling system would unduly add to the mass of the vehicle the weight of the coolant and the plumbing required therefor, as well as invite potential trouble resulting from possible failure of any one of numerous valve mechanisms which would be required in such a system.

Accordingly, it is an object of the present invention to provide a new and improved leading edge construction for the lifting surfaces of a hypersonic aerial vehicle capable of withstanding extreme aerodynamic heating.

Another object of the instant invention is the provision of a new and improved leading edge construction for the lifting surfaces of a hypersonic aerial vehicle capable of withstanding severe aerodynamic heating and characterized by extreme simplicity of construction.

A still further object of the present invention is the provision of a new and improved leading edge construction for the lifting surfaces of a hypersonic aerial vehicle capable of withstanding severe aerodynamic heating, characterized by the utilization of dissimilar structural materials in different thermal environments to advantageously exploit the thermostructural properties of each of these materials.

Another still further objcet of the instant invention is the provision of a new and improved leading edge construction for the lifting surfaces of a hypersonic aerial vehicle capable of withstanding severe aerodynamic heating, characterized by the utilization of dissimilar structural materials in different thermal environments with interconnection means therefor exhibiting the capability of minimizing the buildup of thermal stresses therebetween resulting from the differences in the thermal expansion characteristics of the dissimilar materials.

According to the present invention, the foregoing and other objects are attained by providing, in a substantially metallic basic lifting surface construction for reentry type hypersonic aerial vehicles, an elongated nonmetallic generally hollow leading edge member substantially D-shaped in cross-section with the rounded outer surface thereof defining the leading edge of the surface, and which is provided with a slot extending from the hollow interior thereof to the after outer surface of the member at about the vertical midpoint thereof. There is also provided, in this lifting surface construction, a metallic clip having a forward surface portion abutting the after outer surface of the leading edge member and which includes a narrow forwardly protruding element snugly fitting the slot in the after outer surface of the leading edge member with the forward edge thereof being enlarged within but not filling the hollow interior of the leading edge member to form a mortise and tenon type slip joint, the clip also including elements extending rearwardly in preferably substantially parallel spaced relation from the upper and lower extremities of the forward surface portion thereof; and means for interconnecting the rearwardly extending spaced elements of the clip with the upper and lower surfaces of the substantially metallic basic lifting surface of the hypersonic vehicle.

A more complete appreciation of the invention and many of the attendant advantages thereof will be readily apparent as the same becomes better understood by reference to the following detailed description when considered in connection with the accompanying drawings wherein:

FIG. 7 is an isometric view of a section of the clip element of the present invention;

FIG. 8 is an isometric view, with portions thereof partially broken away, of a section of an alternative and preferred embodiment of the clip of the present invention;

FIG. 9 is a sectional side elevational view of an alternative two part embodiment of the nonmetallic leading edge member of the present invention; and, FIG. 10 is an isometric view of a metallic connecting element for the two parts of the section of the leading edge member of FIG. 9.

Figure 1:
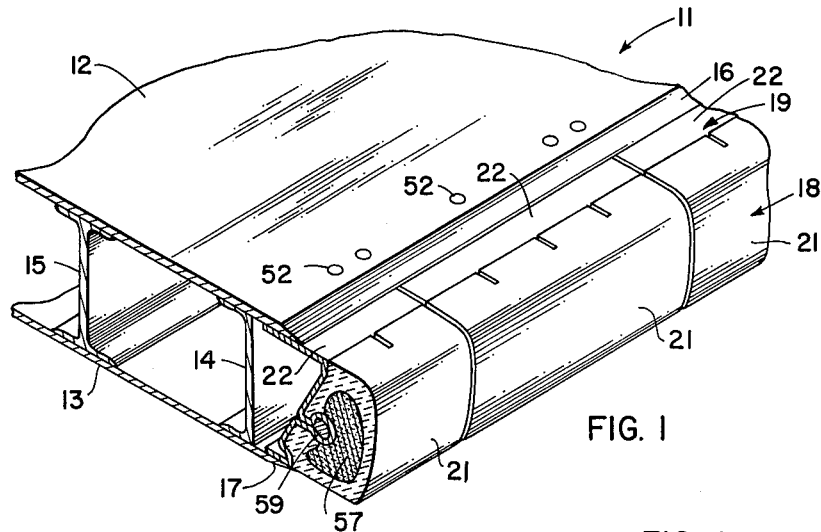
FIG. 1 is a fragmentary isometric view, partially in section, of a generalized lifting surface for a hypersonic aerial vehicle incorporating the leading edge construction of the present invention.
Figure 3:
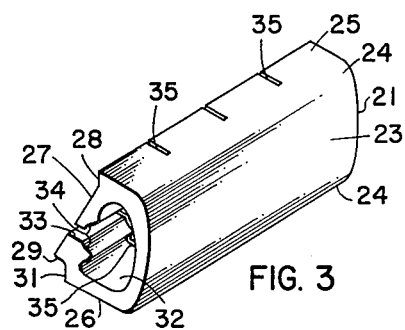
FIG. 3 is an isometric view of a section of the nonmetallic leading edge member of the present invention.
Figure 2:
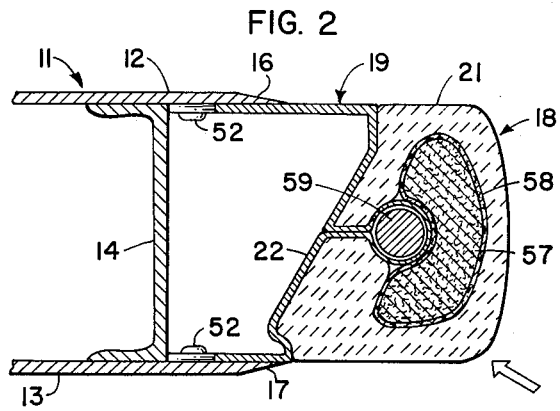
FIG. 2 is a chordwise sectional partial view of the lifting surface and leading edge construction of FIG. 1.

Referring now more particularly to the drawings, wherein like reference numerals designate identical parts throughout the several views, and more particularly to FIGS. 1 and 2, there is shown a generalized lifting surface for a hypersonic aerial vehicle, generally designated by the reference numeral 11. The basic structure of the generalized lifting surface comprises a conventional structural metallic upper outer surface member 12 and a conventional structural metallic lower outer surface member 13. Interposed between and connected to the inner sides of outer surface members 12 and 13 are conventional flanged spar members 14 and 15, which serve to maintain the configuration of lifting surface 11 as well as carry structural loads. It will now be immediately apparent to those skilled in the art that the foregoing description of lifting surface 11 is not intended to define an actual structural design for any specific hypersonic vehicle configuration, but merely serves to illustrate a simple structural arrangement suitable for carrying the leading edge structure hereinafter described. The leading edge of lifting surface 11 is situated adjacent the leading face of spar member 14; the edges of the structural outer surface members 12 and 13 being positioned somewhat forwardly thereof and including tapered portions 16 and 17, respectively, terminating in apices situated in the planes of the inner sides of the structural outer surface members. The leading edge construction illustrated also includes a sectionalized nonmetallic leading edge member, generally designated by the reference numeral 18, and a sectionalized clip member, generally designated by the reference numeral 19.

The leading edge member 18 comprises a plurality of identical sections 21 positioned in substantially abutting side to side relation along the leading edge of lifting surface 11, as clearly indicated in FIG. 1. While it is considered that the provision of a single leading edge member extending along the entire length of the leading edge of surface 11 falls within the scope of the present invention, division of such a member, as hereinbefore described, into a plurality of shorter individual components is preferable, in order to minimize the thermal stresses which build up between the ends of such a member when heated to very high temperatures. The clip member 19 also comprises a plurality of identical clip sections 22 positioned in substantially abutting side to side relation along the leading edge of lifting surface 11, as shown in FIG. 1. While the clip member 19 could also be one single part extending along the entire length of the leading edge of surface 11, sectionalization thereof is deemed preferable for minimization of thermal stresses. The lengths of leading edge member sections 21 and clip member sections 22 are shown as being substantially equal in FIG. 1, with the gaps between the sections of the leading edge and clip members in chordwise alignment, but the length and alignment of the leading edge member and clip member sections may be varied as found necessary or desirable.

Figure 4:
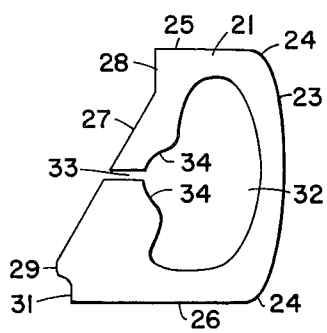
FIG. 4 is a side elevational view of the leading edge member section of FIG. 3.

Each leading edge member section 21, as clearly shown in section in FIG. 2 and in side elevation in FIG. 4, in cross-section is somewhat D-shaped, and essentially forms a "split ring" configuration. The rounded outer surface 23 of the D-shaped member 21 defines the leading edge of the surface 11, and the region of stagnation of the leading edge is centered substantially at the vertical midpoint of surface 23. The vertical midpoint of surface 23 is the most forwardly projecting portion of section 21, and the surface 23 curves rearwardly from the vertical midpoint thereof above and below this point. The curve of outer surface 23 from the vertical midpoint thereof to points adjacent the upper and lower extremities of the surface follows closely a circular arc generated from a point centrally positioned rearwardly of surface 23 a distance on the order of several times the height of surface 23. From the terminal points of this circular central portion of surface 23, the surface is rounded somewhat abruptly at corners 24 into substantially horizontal flat upper and lower surfaces 25 and 26, respectively, of section 21. The resulting rather blunt leading edge shape is in accordance with generally accepted principles of thermoaerodynamics relating to the design of hypersonic hot leading edge sections. Since the hypersonic vehicle during reentry and the greater portion of its flight through the atmosphere is generally maintained at a relatively high angle of attack with respect to the relative wind, as indicated by the direction of the arrow of FIG. 2, for generating sufficient drag to effectively decelerate the vehicle prior to landing, the lower surface 26 of the leading edge member section 21 is more heavily aerodynamically loaded and is heated to higher temperatures than the upper surface 25 thereof. In order to provide more mass in the lower surface 26 of section 21 to carry the heavier airloads imposed thereon at the reduced level of allowable stress resulting from this temperature differential, and also to minimize upwardly directed shearing forces imposed on the joint between leading edge member sections 21 and clip member sections 22, the after outer surface 27 of section 21 is sloped upwardly and forwardly throughout the greater portion of its height, forming an angle on the order of 60 degrees with the lower outer surface 26 of section 21, with the result that the area of surface 26 is greater than that of surface 25, while the greater portion of surface 27 is substantially normal to the relative wind when the angle of attack is on the order of 30 degrees. This particular slope of surface 27, however, is considered merely exemplary, and may be varied as found suitable for any specific design for a hypersonic vehicle lifting surface leading edge according to the particular requirements therefor. The after surface 27 of section 21, at the upper extremity thereof, is also provided with a substantially vertically disposed portion 28; and adjacent the lower extremity thereof is provided with a forwardly curved portion 29, which terminates in a substantially vertical portion 31 connecting the curved portion 29 and the rearward edge of lower outer surface 26. The portions 28 and 29 of surface 27 tend to resist downwardly directed shearing movement of the leading edge member sections 21 with respect to clip member sections 22 when the angle of attack is materially reduced below the level maintained for reentry and deceleration flight which reduces shear loading at the joint between sections 21 and 22.

The sections 21 are each provided with a central void space 32 which defines the interior surface of the "split ring" configuration thereof. Void 32 is of an irregular generally oval form, and is so proportioned that the wall thickness of element 21 adjacent the region of stagnation along the vertical midpoint of outer surface 23 is a minimum. The wall thickness of the "split ring" then gradually increases in each direction along surface 23 from the region of stagnation; the wall thickness along upper surface 25 and lower surface 26 being decidedly greater than that at the vertical midpoint of surface 23. The thickness of the wall along the after surface 27 of element 21 is still greater, with the thickness of the portion of this wall disposed below the vertical midpoint of surface 27 being considerably greater than the thickness of the wall portion disposed thereabove. A slot 33 having opposed substantially parallel spaced walls is located at about the vertical midpoint of surface 27 and projects substantially horizontally forwardly therefrom towards void space 32, connecting void 32 with surface 27 and dividing the sloped portion of surface 27 into upper and lower segments. The corners between each wall of slot 33 and the adjacent portion of the interior surface of void space 32 are rounded out to provide internally arcuate corner portions 34, which together define a substantially hemi-cylindrical enlargement of void space 32.

Each leading edge member section 21 is also preferably provided with a plurality of spaced vertical slots 35 extending forwardly through the entire depth of the surface 27 thereof toward the leading edge of the section. Each of these slots 35 terminates short of penetration of the forward arc of the section 21, which may be roughly defined as that portion thereof located forwardly of the chordwise midpoint of the upper surface 25 thereof. These slots 35 provide segmentation of the most massive portions of the section 21 and materially serve to reduce the buildup of thermal stresses along the length of the aftermost portion of the section, thereby keeping these stresses within a tolerable magnitude.

Each section 21 of the leading edge member is formed of a suitable nonmetallic substance, preferably a sintered ceramic material such, by way of example, as stabilized zirconia, in which is combined the qualities of extremely high melting temperature, high oxidation resistance, and superior elevated temperature structural strength properties. It is also contemplated that suitable graphites may be useable in making the sections 21, although it will generally be necessary in such a case to provide this material with a fairly thin coating of pyrolytic graphite for oxidation protection. The leading edge member sections 21 composed of the foregoing substances in most cases may be made either by the molding process, or by machining from suitable bar stock.

The leading edge member sections 21, as indicated hereinbefore, are each provided with the rather blunt leading edge or forebody configuration considered preferable for hypersonic hot leading edge sections. While this leading edge shape is considered optimum for a rather wide range of thermoaerodynamic conditions, it is by no means the only configuration acceptable in this type of leading edge. Accordingly, and by way of example, two alternative embodiments of a forebody configuration for leading edge member section 21 are shown in side elevation in FIGS. 5 and 6 of the drawings. The section 21 of FIG. 5, in lieu of the particular rounded forward surface 23 hereinbefore described, is provided with a forward surface 36 which is considerably more rounded than surface 23. The thickness of the forward wall of this section adjacent the region of stagnation thereof, which is positioned substantially along the vertical midpoint of surface 36, is comparable to the thickness of the forward wall of the section 21 incorporating forward surface 23 adjacent the region of stagnation thereof, but the forward wall of the section incorporating forward surface 36 is substantially uniform in thickness along its entire height. The section 21 of FIG. 6, in lieu of the particular rounded forward surface 23 hereinbefore described, is provided with a rounded forward surface 37 which substantially corresponds in curvature to the surface 36 shown in FIG. 5. The forward wall of the section 21 of FIG. 6, however, primarily differs from that of the section of FIG. 5 in that it is much thicker, approaching the thickness of the upper and lower surface walls of the section, although the forward wall of the section of FIG. 6 is also of substantially uniform thickness. The elevated temperature characteristics of these various leading edge configurations will be more fully explained hereinafter.

Since the leading edge member sections 21, when formed of the hereinbefore enumerated nonmetallic substances, will be relatively brittle, the means for attaching these sections to the substantially metallic basic structure of the lifting surface 11 must be such that unnecessary thermal stresses are not introduced therethrough into these sections of the leading edge member. Accordingly, the sections 22 of clip member 19 have been designed to provide, among other advantages more particularly set forth hereinafter, a connection between the sections 21 and the forward surface of clip member sections 22 operable to prevent the unnecessary imposition of thermal differential stresses upon the sections 21. More particularly, referring now to FIG. 7, each of the clip member sections 22, which are preferably formed from stainless sheet steel, is provided with a forward surface including sloped upper and lower segments 38 and 39, respectively, which are proportioned to abut the upper and lower segments of the sloped portion of surface 27, respectively, of a section 21. The forward surface of each clip section 22 also includes a portion 41 extending vertically upwardly from the upper extremity of segment 38 and a curved portion 42 positioned adjacent the lower extremity of segment 39 which terminates in a downwardly directed vertical portion 43; these portions being proportioned to abut the portions 28, 29, and 31, respectively, of a leading edge member section 21. The contiguous edges of the segments 38 and 39 of the clip 22 are provided with substantially horizontally disposed flange portions 44 and 45, respectively, which project forwardly from the forward sloped surface of the clip 22 a distance equal to the length of the slot 33 between the surface 27 and the corner portions 34 of a section 21. The forward ends of flange portions 44 and 45 are interconnected by means of a cylindrical section 46 which is equal in diameter to the diameter of the hemi-cylindrical enlargement of the void space 32 of the element 21 defined by the corners 34; the cylindrical section 46 completing the connection between the flange portions 44 and 45 on the side thereof opposite the flange portions, and providing the sole physical connection between the segments 38 and 39 of clip section 22. The clip section 22 is also provided, at the upper and lower extremities, respectively, of portions 41 and 43 of the forward surface thereof, with an upper surface element 47 and a lower surface element 48; these surface elements extending rearwardly in substantially horizontal parallel relation and spaced apart a distance substantially equal to the spacing between the interior sides of the outer surface members 12 and 13 of lifting surface 11. The trailing edges of elements 47 and 48 are each provided with several rearwardly extending tab sections 49, each of which is provided with a vertical bore 51, and which constitute part of the means for attaching the clip sections 22 to the structure for lifting surface 11.

While the clip sections 22 hereinbefore described are deemed suitable for use in the leading edge construction forming the subject matter of the present invention, thermal stresses of considerable magnitude may be readily developed along the length thereof in the area in contact with a leading edge section 21, since considerable heat is transferred by conduction from the section 21 to this area of the clip section 22. Accordingly, an alternative embodiment of the clip member section 22 is shown in FIG. 8 of the drawings and which is considered preferable, since this embodiment of clip member section 22 is segmented in the region thereof in contact with the leading edge member sections 21 to reduce thermal stresses between the ends thereof. The embodiment of clip member section 22 shown in FIG. 8 is essentially the basic clip member section shown in FIG. 7, but has been modified to include spaced cutouts selectively positioned along the length thereof. The cylindrical portion 46 of the clip member section 22 of FIG. 8 is provided with a spaced series of cutouts 53, each of which extends from about the upper central portion thereof to a position spaced about one-eighth of the way around the perimeter of portion 46 from the most forward limit of flange portion 45. The width of each of the cutouts 53 along the length of cylindrical portion 46 is about equal to the spacing between adjacent cutouts 53, which means that about half of the material of cylindrical portion 46 within the described radial limits has been removed. Cutouts 54 are also formed in the upper segment 38 and flange portion 44, extending downwardly from a point about equidistant from the upper and lower extremities of segment 38 to flange portion 44 and thence into flange portion 44 to about the point of intersection thereof with cylindrical portion 46. Cutouts 54 are substantially equal in width to cutouts 53, and may be alternately positioned with respect thereto along the length of the clip member section 22, as shown, or may be aligned therewith along the length of section 22. Cutouts 55 substantially similar to cutouts 54 are also formed in lower segment 39 and flange portion 45, extending upwardly from a point about equidistant from the upper and lower extremities of segment 39 to flange portion 45 and thence into flange portion 45 to about the point of intersection thereof with cylindrical portion 46. Cutouts 55 are substantially equal in width to cutouts 54 and are alternately disposed with respect thereto along the length of section 22. Additional cutouts 56 may also be provided in segment 39 of section 22 between the lower extremity thereof and the lower limits of cutouts 55, proportioned and spaced as found desirable. Such additional cutouts 56 may be also provided in corresponding locations in segment 38 of section 22, if found desirable. It will now be immediately apparent that such segmentation of critically heated portions of section 22 will materially reduce thermal stresses between the longitudinal extremities thereof in much the same manner hereinbefore described regarding the action of slots 35 in the sections 21.

The leading edge construction of the present invention is assembled by placing a plurality of clip member sections 22 in aligned substantially abutting side to side relation along the leading edge of lifting surface 11, with the upper and lower surface elements 47 and 48 thereof in contact with the inner sides of upper and lower outer surface members 12 and 13 of the basic lifting surface 11, respectively, and connecting these abutting surfaces with conventional fasteners 52 extending through the bores 51 formed in the tabs 49 associated with the surface elements 47 and 48. A plurality of leading edge member sections 21 are then slidably connected with the clip member sections 22 by positioning each section 21 in turn adjacent the side of one of the end sections 22 forming clip member 19, with the slot 33 thereof in alignment with the flange portions 44 and 45 of the section 22, and with the hemi-cylindrical enlargement of the void space 32 thereof in alignment with the cylindrical portion 46 of section 22, and then sliding the leading edge sections into contact with the clip member 19. It will now be immediately aparent that the slip fit connection between leading edge member 18 and clip member 19 permits relative movement therebetween in a high temperature environment, and precludes the introduction of unnecessary thermal stresses into the brittle member 18 from member 19 as a result of differences in thermal elongation thereof.

The assembly of the leading edge construction of the present invention is completed by filling the void space 32 of the leading edge member sections 21 with an insulation core 57 as shown in FIGS 1 and 2, preferably in the form of a powder of sintered ceramic of monodispersed particle fraction, having proper grain size and distribution to maximize total porosity and minimize pore diameter, minimum thermal conductivity, and a coefficient of thermal expansion higher than that of the nonmetallic material of which the leading edge member sections 21 are formed. Suitable refractory bulk fiber may also be used as the material for core 57 if the coefficient of thermal expansion is sufficiently equivalent to that of the hereinbefore mentioned powder of sintered ceramic. A highly refractory fiber sleeve element 58 is positioned between core 57 and the adjacent surfaces of void 32 and the cylindrical portion 46 of clip member sections 22, as shown in FIG. 2, to prevent spillage of the material of core 57. Finally, a highly efficient cylindrical metal heat sink element 59 may be positioned within the cylindrical portion 46 of the clip sections 22, if desired, as shown in FIGS. 1 and 2.

Figure 5:
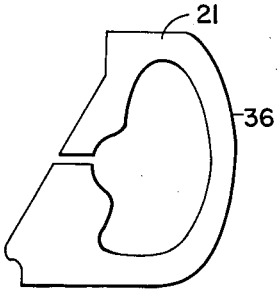
FIGS. 5 and 6 are side elevational views of two alternative embodiments of the sectional leading edge member of the present invention.
Figure 6:
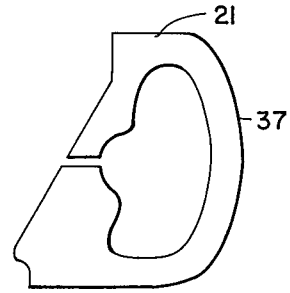

Upon reentry into the earth's atmosphere of a hypersonic vehicle carrying lifting surfaces provided with the leading edge construction hereinbefore described, the temperature of the rounded forward outer surface of the leading edge member, whether of the particular cross-section best shown in FIGS. 4, 5, or 6, rises very rapidly, especially along the point thereof adjacent the region of stagnation of the leading edge. The rate of temperature rise on the outer surface of the leading edge forebody wall at this point is greater than on the inner surface thereof immediately therebehind, and is also greater than the rate of temperature rise of the cylindrical portion 46 of clip member sections 22. This temperature differential between the inner and outer surfaces of the leading edge section forebody wall adjacent the region of stagnation causes the outer surface to expand at a greater rate than the inner surface, which increases the curvature of the forebody wall and tends to force the "split ring" configuration of the section to close, while the mechanical restraint developed by the clamping action of the sheet metal disposed between the upper and lower extremities of the forward face of the clip member section 22 upon the leading edge member section 21, coupled with aerodynamic impact pressure developed along the forward outer surface of the section 21, tends to keep the "split ring" shut. Thus, tensile thermal stresses which develop in the region of the inner surface of the forward wall of section 21 at the region of stagnation are reduced by compressive mechanical stresses through the action described. On the cooling cycle of the leading edge, the temperature of the outer surface of the forward wall of section 21 at the region of stagnation tends to decrease faster than on the inner surafce of this wall at this point, and also faster than on the cylindrcal portion 46 of clip member section 22, with the result that tensile stresses are developed on the outer surface of the forward wall of section 21 at the region of stagnation. These stresses, however, are reduced by compressive mechanical stresses set up in this region arising from the fact that the high retained temperature in cylindrical portion 46 of the section 22 tends to spring open portion 46 to a greater diameter, in turn springing open the "split ring" section 21, which is made possible through the reduction of the forces previously tending to hold it shut, resulting from the reversal of the relative magnitudes of the temperatures on the inner and outer surfaces of the forward wall thereof. The reason for the various sectional wall configurations for the different forebody shapes of the leading edge sections 21 best seen in FIGS. 4, 5, and 6 will now be apparent, since these particular wall configurations have been selected on the basis of the thermo-mechanical stress characteristics obtainable therewith.

During service exposure, as the leading edge sections 21 absorb heat, the mechanical strength properties of the material of which the sections are formed deteriorate. At the same time, the core 57 within sections 21 absorbs heat, and expands at a faster rate than the material of sections 21, thereby exerting internal pressure upon the interior surface of the walls thereof to help support the sections 21 against the external fluid pressures applied thereupon by the hypersonic airstream responsible for heating the sections. The use of the heat sink member 59 within the cylindrical portion 46 of sections 22 may be desirable in some cases, also, to alter the leading edge elevated temperature characteristics to fit specific requirements thereof.

An alternative embodiment of the nonmetallic leading edge member construction of the present invention is shown in FIG. 9 of the drawings. In some cases, it may be desirable to provide a rather long and forwardly tapered leading edge member section to obtain desirable aerodynamic characteristics. Accordingly, the section shown is provided with such an external configuration, and this section is preferably formed of fore and aft nonmetallic elements 61 and 62. The forward element 61 is a "split ring" configuration provided with roughly the same cross-sectional proportions as the section 21 of FIG. 6, but has a more rounded forward surface and is somewhat smaller in size. The after outer surface of element 61 and the forward outer surface of element 62 are shaped for abutting contact, and the after outer surface of element 62 is shaped for interconnection with the clip member 19 hereinbefore described. Element 62 is provided with a pair of void spaces 63, the aftermost of which is also provided with a hemi-cylindrical enlargement 64 adapted to receive the cylindrical portion 46 of a clip member section 22. The forward void space 63 of element 62 is also provided with a similar enlargement 64 adjacent the forward surface thereof, and a slot extends between this enlargement and the forward outer surface of element 62, communicating with the slot in the after surface of element 61 which compares with the slot 33 of section 21. A sheet metal clip element, generally designated by the reference numeral 65, is provided for interconnecting elements 61 and 62, as shown in FIG. 9.

The specific construction of sheet metal clip 65 is clearly shown in FIG. 10. The clip 65 is provided with a pair of tubular portions 66 similar to the portion 46 of a sheet metal clip member section 22, which are disposed in a fore and aft relationship. Upper coplanar strips 67 and lower coplanar strips 68 extend between tubular portions 66; strips 67 and 68 being alternately disposed along the length of clip element 65, with the only physical connection between the upper and lower halves of clip element 65 being provided at the outermost radial extremities of tubular portions 66. Cutouts 69 are provided in portions 66 of element 65 similar to the cutouts 53 formed in the clip member section 22 of FIG. 8.

The desirability of making such a leading edge member section in two parts is found in the fact that different nonmetallic refractory materials may be advantageously used therefor. Element 61, which is the hotter of the two, is preferably made of the materials used in making leading edge member sections 21. Element 62, however, which operates at lower temperatures, may more advantageously be made of a material which does not possess the same high levels of elevated temperature properties as the material of element 61, but which is a better insulator, and may therefore more effectively block heat transfer between element 61 and the metallic portion of the leading edge construction.

The thermo-mechanical interaction between the leading edge member elements 61 and 62, and the interconnecting clip element 65, although occurring at two separate places, is exactly analogous to the interaction between a leading edge member section 21 and a clip member section 22, as described hereinbefore, and further amplification thereof at this point is not considered necessary.

Obviously, many modifications and variations of the present invention are possible in the light of the above teachings. It is therefore to be understood that within the scope of the appended claims, the invention may be practiced otherwise than as specifically described.

What is claimed as new and desired to be secured by Letters Patent of the United States is:

1. An airfoil construction for hypersonic aerial reentry vehicles subject to extreme aerodynamic heating of leading edge portions during hypersonic travel through the earth's atmosphere, comprising: a main body and a leading edge member arranged in abutting relation along a spanwise plane of jointure and cooperating to form a complete airfoil; said leading edge member being composed of ceramic material which is resistant to oxidation and other deterioration at leading edge reentry temperatures but which has relatively low strength in bending and tension; said main body being composed of metallic material having relatively high strength at operating temperatures; and slip joint means inseparably connecting said leading edge member to said main body while providing relative movement therebetween to accommodate temperature-caused dimensional variations and prevent stress concentrations.

2. A construction as claimed in claim 1 in which said leading edge member is generally tubular in form, providing a spanwise void therein, and is provided with a spanwise extending slot in its rear wall communicating said void with the rear surface of said member; and said slip joint means comprises a spanwise extending planar metallic member carried by said main body extending through said slot and provided at its free edge with detent means to prevent separation of said leading edge member from said main body.

3. A leading edge construction for an airfoil carried by an aerial vehicle capable of attaining hypersonic speeds within the earth's atmosphere, comprising an elongated nonmetallic leading edge member having a substantially rounded forward surface, an after surface, a substantially centrally disposed void space extending along the length thereof, and a slot extending substantially horizontally between said void space and said after surface along the length of said leading edge member; an elongated metallic clip member including a forward surface conforming to the after surface of said leading edge member, said leading edge member after surface and said metallic clip member forward surface being disposed in abutting relation, a forwardly protruding element projecting substantially horizontally from said clip member forward surface into and substantially completely occupying said leading edge member slot, detent means having a thickness greater than the width of said leading edge member slot carried at the free end of said forwardly protruding element and occupying a portion of said leading edge member void space, said detent means preventing inadvertent withdrawal of said protruding element from said leading edge member slot in a rearward direction yet permitting lengthwise relative displacement of said leading edge member and said metallic clip member, said clip member including means extending rearwardly from said forward surface thereof and contacting said airfoil, and means connecting said clip member rearwardly extending means to said airfoil.

4. A leading edge construction for a lifting surface carried by an aerial vehicle capable of attaining hypersonic speeds within the earth's atmosphere, comprising an elongated nonmetallic leading edge member having a substantially rounded forward surface and an after surface, said leading edge member including a substantially centrally disposed void space extending along the length thereof and a slot extending substantially horizontally between said after surface and said void space throughout the length of said leading edge member, an elongated metallic clip member including a forward surface conforming to the after surface of said leading edge member, said leading edge member after surface and said metallic clip member forward surface being disposed in abutting relation, a narrow forwardly protruding element projecing substantially horizontally from said clip member forward surface into and substantially completely occupying said leading edge member slot, a hollow cylindrical portion interconnected with said forwardly protruding element at the forward end thereof, the diameter of said cylindrical portion being greater than the width of said leading edge member slot and the area thereof being less than the area of said void space of said leading edge member, said cylindrical portion being positioned in said void space and preventing inadvertent withdrawal of said protruding element from said leading edge member slot in the rearward direction, said clip member including means extending rearwardly from said forward surface thereof and contacting said lifting surface, and means connecting said clip member rearwardly extending means to said lifting surface.

5. The leading edge construction as defined in claim 4, wherein said protruding element includes upper and lower planar portions disposed in contiguous relation, said connection between said cylindrical portion and said protruding element being such that said upper and lower planar portions thereof are only indirectly connected one to another through substantially the entire perimetrical wall of said cylindrical portion.

6. The leading edge construction as defined in claim 5, wherein said clip member forward surface is divided into upper and lower segments, the lower edge of said upper segment being connected to the aftermost edge of said protruding element upper planar portion, and the upper edge of said lower segment being connected to the aftermost edge of said protruding element lower planar portion.

7. The leading edge construction as defined in claim 6, wherein said leading edge member is provided with a plurality of spaced vertical slots penetrating the after surface thereof and extending to substantially the chordwise midpoint of said void space.

8. The leading edge construction as defined in claim 7, wherein the portion of said leading edge member void space unoccupied by said tubular portion of said clip member is substantially filled with a core material having a higher coefficient of thermal expansion than the nonmetallic material of said leading edge.

9. The leading edge construction as defined in claim 8, wherein said clip member tubular portion, said upper and lower planar portions of said protruding element, and said upper and lower segments of said forward surface of said clip member are provided with cutouts spaced along the lengths thereof to provide segmentation therefor.

10. The leading edge construction as defined in claim 4, wherein the portion of said leading edge member void space unoccupied by said tubular portion of said clip member is substantially filled with a core material having a higher coefficient of thermal expansion than the nonmetallic material of said leading edge.

11. The leading edge member as defined in claim 4, wherein said leading edge member is provided with a plurality of spaced vertical slots penetrating the after surface thereof and extending to substantially the chordwise midpoint of said void space.

12. The leading edge member as defined in claim 11, wherein the portion of said leading edge member void space unoccupied by said tubular portion of said clip member is substantially filled with a core material having a higher coefficient of expansion than the nonmetallic material of said leading edge.

13. The leading edge member as defined in claim 6, wherein said clip member tubular portion, said upper and lower planar portions of said protruding element, and said upper and lower segments of said forward surface of said clip member are provided with cutouts spaced along the lengths thereof to provide segmentation therefor.

14. A leading edge construction for a lifting surface carried by an aerial vehicle capable of attaining hypersonic speeds within the earth's atmosphere, comprising an elongated nonmetallic leading edge member including a nonmetallic forward section, a nonmetallic after section, and metallic clip means connecting said nonmetallic forward and after sections in abutting relation, said nonmetallic forward section having a substantially rounded forward surface defining a leading edge member forward surface and said nonmetallic after section having an after surface defining a leading edge member after surface, said nonmetallic leading edge member after section including at least one substantially rearwardly disposed void space extending along the length thereof and a slot extending substantially horizontally between said leading edge member after surface and said void space throughout the length of said leading edge member, an elongated metallic clip member including a forward surface conforming to the after surface of said leading edge member, said leading edge member after surface and said metallic clip member forward surface being disposed in abutting relation, a narrow forwardly protruding element projecting substantially horizontally from said clip member forward surface into and substantially completely occupying said leading edge member slot, a hollow cylindrical portion interconnected with said forwardly protruding element at the forward end thereof, the diameter of said cylindrical portion being greater than the width of said leading edge member slot and the area thereof being less than the area of said void space of said leading edge member, said cylindrical portion being positioned in said void space and preventing inadvertent withdrawal of said protruding element from said leading edge member slot in the rearward direction, said clip member including means extending rearwardly from said forward surface thereof and contacting said lifting surface, and means connecting said clip member rearwardly extending means to said lifting surface.

References Cited in the file of this patent

UNITED STATES PATENTS 2,482,936    Renoux  ---------------  Sept. 27, 1949